Figure 1:
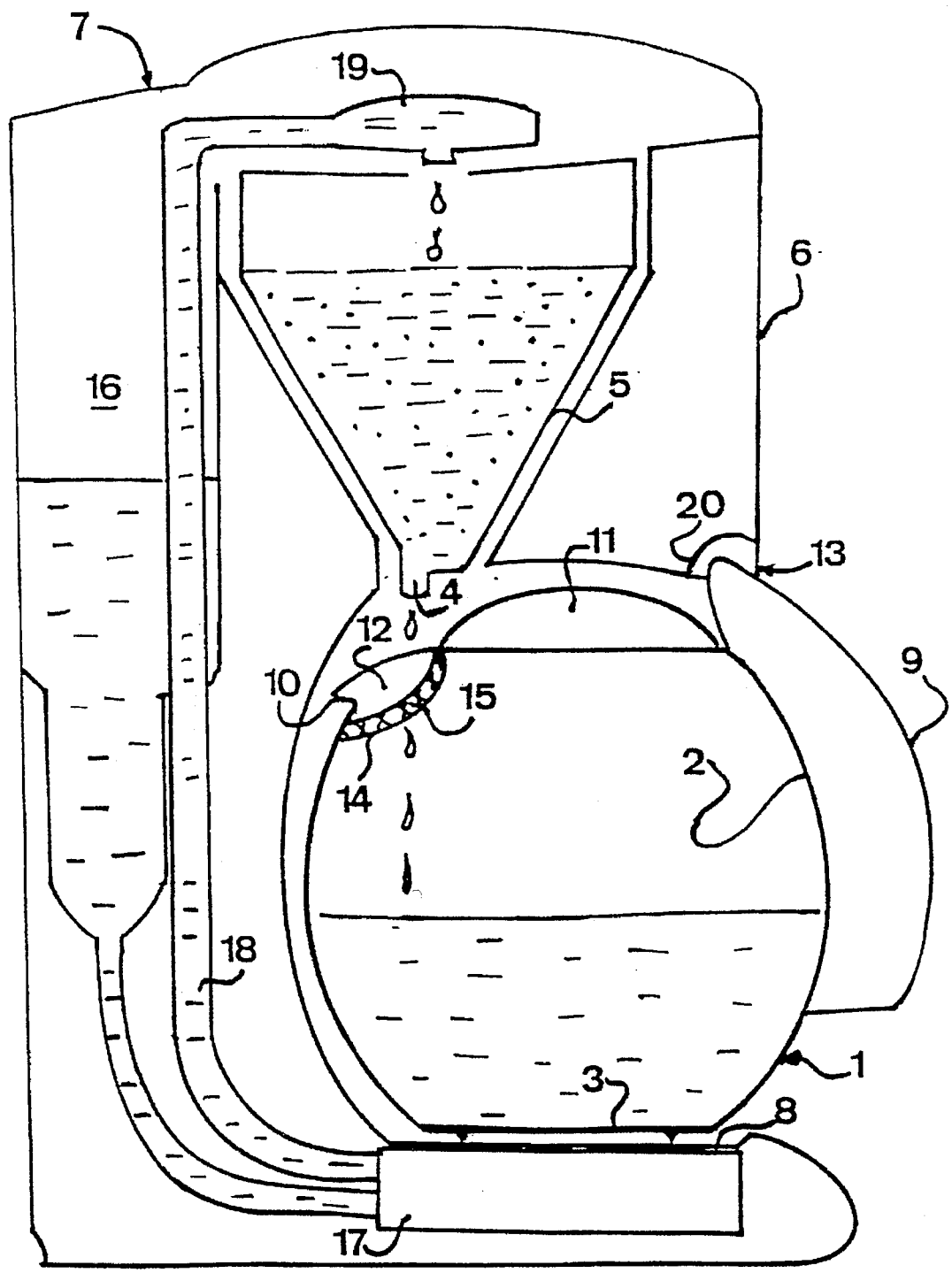

United States Patent [19]
Jouatel et al.

[11] Patent Number: 5,634,395
[45] Date of Patent: Jun. 3, 1997

[54] INFUSION MACHINE

[75] Inventors: Christian B. Jouatel, Radon; Francis P. J. Landais, deceased, late of Mamers, both of France, by Pierre Chevalier, legal representative

[73] Assignee: Moulinex S.A., Bagnolet, France

[21] Appl. No.: 578,681

[22] PCT Filed: Jun. 21, 1994

[86] PCT No.: PCT/FR94/00749

§ 371 Date: Apr. 5, 1996

§ 102(e) Date: Apr. 5, 1996

[87] PCT Pub. No.: WO95/01118

PCT Pub. Date: Jan. 12, 1995

[30] Foreign Application Priority Data

Jun. 30, 1993 [FR] France .................. 93 08016

[51] Int. Cl.$^6$ .................................................. A47J 31/057
[52] U.S. Cl. ............................................................ 99/307
[58] Field of Search ............................ 99/306, 307, 295, 99/300, 302 R, 304, 305, 316, 317, 279, 299; 426/433

[56] References Cited

U.S. PATENT DOCUMENTS

| | | | |
|---|---|---|---|
| 4,888,465 | 12/1989 | Hoffmann | 99/307 |
| 5,081,915 | 1/1992 | Beumer | 99/306 |
| 5,231,918 | 8/1993 | Grzywna | 99/307 |
| 5,239,914 | 8/1993 | Saldmon et al. | 99/307 |
| 5,251,541 | 10/1993 | Anson et al. | 99/307 |

*Primary Examiner*—Robert W. Jenkins
*Attorney, Agent, or Firm*—Young & Thompson

[57] ABSTRACT

Brewing apparatus comprising a brew-collecting container (1), defined by a sidewall (2) and a bottom wall (3), that can be placed under the outlet (4) of a filter (5) of a housing (6) of a brewing apparatus (7), in such a way that it rests on a base (8) of said brewing apparatus (7). The container (1) includes a handle (9) fastened to said sidewall (2) by fastening means, a spout (10) through which the brew is poured out of the container (1) and a lid (11) which has an opening (12) through which the brew flows into the container. In accordance with the invention, the opening (12) is located in alignment with the spout (10), and the outlet (4) of the filter (5) is arranged so as to overlay said spout (10) in a brewing position. The invention is particularly useful for electric coffee-makers.

5 Claims, 2 Drawing Sheets

INFUSION MACHINE

The invention concerns an infusion machine having an infusion collection receptacle delimited by a lateral wall and a base wall and capable of being placed beneath the outlet orifice of a filter of an infusion machine, such as a coffee maker of the drip type, for example. The said collection receptacle generally rests on a base of the said infusion machine.

The infusion collection receptacle comprises a handle fixed to the said lateral wall by attachment means, a spout through which the infusion is poured out of the receptacle and a lid with an opening through which the infusion flows into the receptacle.

The lid of an infusion collection receptacle of a known type has a central opening capable of being placed beneath the outlet orifice of the filter, through which the infusion may drip. Such a receptacle with several openings, namely the spout and the said central opening, allows a significant amount of air to circulate, which is detrimental to the obtaining of a good infusion aroma and leads to heat losses which change the nature of the infusion obtained.

The aim of the invention is to remedy the aforementioned drawbacks by using an infusion machine having an infusion collection receptacle which thus preserves most of the characteristics of the infusion that it contains.

According to the invention, the opening is situated opposite the spout and the outlet orifice of the filter is arranged so as to hang over the said spout in an infusion position.

According to another characteristic of the invention, the infusion collection receptacle has a grille positioned close to the spout, designed to close off the opening situated opposite the spout at the end of the infusion process.

By means of such an infusion collection receptacle, most of the aroma of the infusion is preserved within the receptacle without the use of a sealing joint. Moreover, the reduction in the number of openings at the upper periphery of the infusion collection receptacle limits heat losses, thereby improving the temperature of the infusion.

Furthermore, owing to the airtightness of the receptacle, air does not filter into the inside of the receptacle, and no oxidation of the infusion is therefore produced, and the steam formed within the receptacle does not escape, thereby preventing any caramelization of the infusion.

Figure 2:
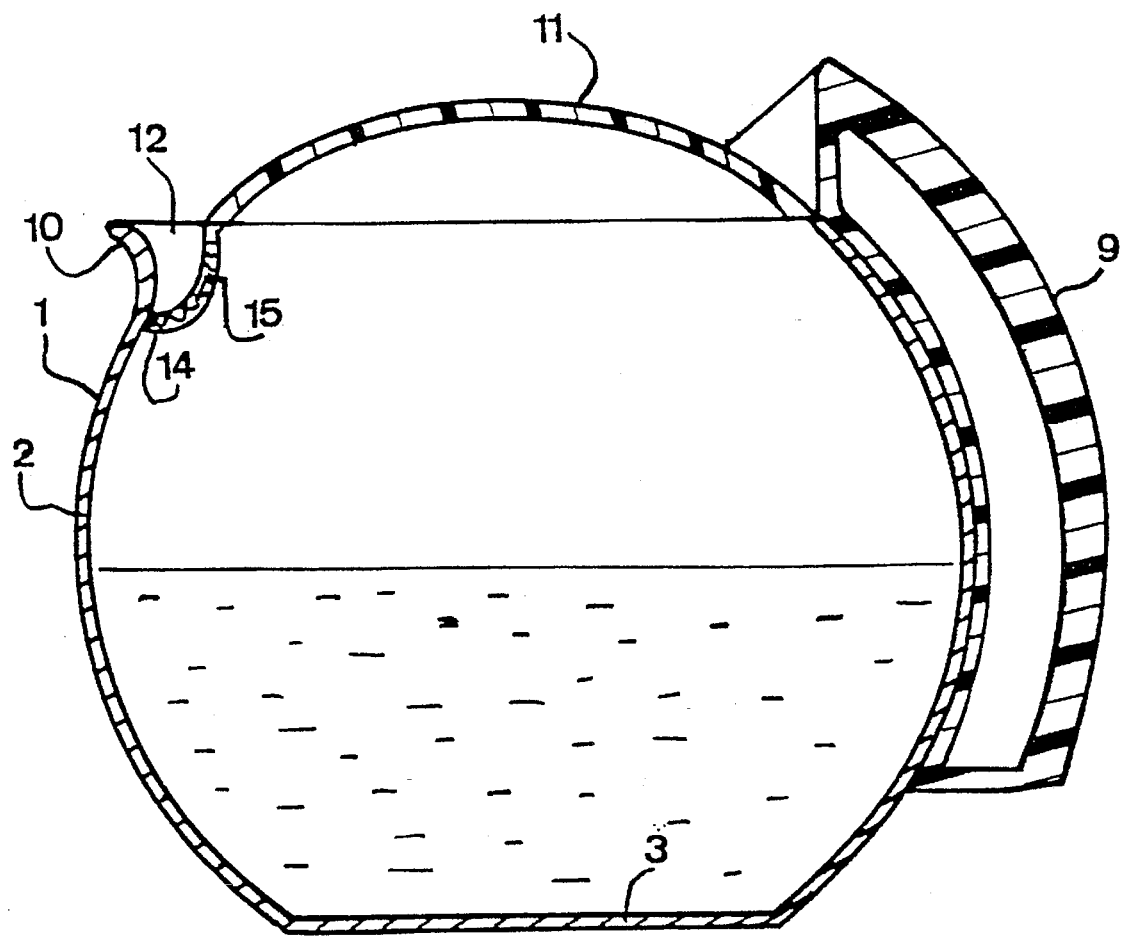

The characteristics and advantages of the invention will, moreover, emerge from the following description, taken as a non-limitative example, with reference to the accompanying drawings in which:

FIG. 1 is a schematic view of an infusion machine in which an infusion collection receptacle according to the invention is positioned, FIG. 2 is a vertical section, to a larger scale, of the infusion collection receptacle of FIG. 1.

According to FIG. 1, an infusion machine 7, such as a coffee maker of the drip type, for example, comprises, inside a casing 6, a cold-water reservoir 16 and a water heater 17 supplied by this reservoir 16 and itself supplying, via an ascending hot-water tube 18, a spray nozzle 19 designed to spray a removable filter 5 known per se, fitted inside the said casing 6 and designed to receive ground coffee.

The filter 5 has an outlet orifice 4 beneath which is placed an infusion collection receptacle 1 resting on a base 8 of the said infusion machine 7.

The infusion collection receptacle 1 is delimited by a lateral wall 2 and a base wall 3. The said receptacle 1 comprises a handle 9 fixed to the lateral wall 2 by attachment means, a spout 10 through which the infusion can be poured out of the receptacle 1 and a lid 11 with an opening 12 through which the infusion flows into the said collection receptacle 1.

In our example embodiment, the lid 11 is fixed to the handle 9.

According to the invention, the opening 12 is situated opposite the spout 10 and the outlet orifice 4 of the filter 5 is arranged so as to hang over the said spout 10 in an infusion position.

The infusion collection receptacle 1 has a locating means 13 suitable for positioning the spout 10 opposite the outlet orifice 4 of the filter 5 in the infusion position. The said locating means 13 has a recess 20 formed in the casing 6 and in which part of the handle 9 of the receptacle 1 fits when the receptacle 1 is positioned on the base 8.

The lateral wall 2 of the infusion collection receptacle 1 is spherical in shape, as is the lid 11 partially closing the receptacle 1. The infusion collection receptacle 1 has a grille 14 positioned close to the spout 10 and which is designed to block the opening 12 in the lid 11 when the infusion has finished passing through, the said grille 14 being fixed, for example by bonding, to the lateral wall 2 of the said receptacle 1.

According to FIG. 2, where the same reference numerals designate the same components as those illustrated in FIG. 1, the grille 14 of the infusion collection receptacle 1 has several holes 15 whose dimensions are determined in such a way as either to allow the free flow of the infusion through the said holes 15, or to offer a resistance, during a final phase of the outflow, to the passage of the infusion through the said holes 15, produced by an effect of clinging of the infusion to the rim of the holes 15, thus creating a liquid seal automatically closing off each hole 15.

The functioning of such a receptacle according to the invention will now be explained in greater detail.

During the operation of the coffee maker, after a few minutes of heating, the hot water sprays the ground coffee present in the filter and causes it to swell progressively. The infusion obtained in this way escapes through the outflow orifice 4 of the filter 5 and flows out through the single opening 12 into the infusion collection receptacle 1 through the grille 14. When the flow of the infusion comes to an end, in other words when it reaches the final phase of the infusion, a film of liquid sticks to the grille to form a liquid seal on the holes 15. In this way, a total closure of the infusion collection receptacle 1 is obtained, thereby preserving the aroma and temperature of the infusion contained in the receptacle 1.

Because of the locating means 13, the user can position the infusion collection receptacle 1 on the base 8 without looking and automatically obtain the correct positioning of the spout 10 and therefore of the opening 12 beneath the outlet orifice 4 of the filter 5. This device also offers a further technical advantage since, because the flow of the infusion takes place within the casing 6 of the coffee maker 7, the heat is practically enclosed inside the casing 6.

Moreover, this coffee maker is aesthetically pleasing since the parts necessary for the flow and for the collection of the infusion are concealed deep within the casing.

We claim:

1. Infusion machine comprising a casing (6) and an infusion collector receptacle (1) delimited by a side wall (2) and a rear wall (3), adapted to be disposed beneath the outlet opening (4) of a filter (5) arranged in said casing (6), said collector receptacle (1) comprising a handle (9), a spout (10) by which the infusion is poured from the receptacle (1) and a cover (11) having an opening (12) through which the infusion flows into the receptacle and which is located facing the spout (10), whilst the outlet opening (4) of the filter (5) is so arranged as to overlie said spout (10) in an infusion position; said machine comprising also indexing means (13) adapted to position the spout (10) facing the outlet opening (4) of the filter (5) in the infusion position, characterized in that, the casing (6) comprises a base (8) on which rests the collector receptacle (1) in the infusion position and the handle (9) of said receptacle (1) being secured to the side wall (2) of this latter by attachment means, the indexing means (13) comprising a recess (20) provided in the casing (6) and in which a portion of the handle (9) of the collector receptacle (1) is received when said receptacle (1) is positioned on the base (8).

2. Infusion machine according to claim 1, characterized in that the collector receptacle (1) comprises a grill (14) positioned adjacent the spout (10) and adapted to close the opening (12) located facing the spout (10) at the end of the infusion passage.

3. Infusion machine according to claim 2, characterized in that the grill (14) is secured by cementing on the side wall (2) of the collector receptacle (1).

4. Infusion machine according to claim 2, characterized in that the grill (14) has several holes (15) whose dimensions are so determined as either to permit the free flow of the infusion through said holes (15) or to provide in the final phase of the flow a resistance to the passage of the infusion through said holes (15) arising from the attachment effect of the infusion to the edge of the holes (15), thereby creating a liquid joint automatically closing each hole (15).

5. Infusion machine according to any one of the preceding claims, characterized in that the side wall (2) of the collector receptacle (1) having a spherical shape, the cover (11) of said receptacle also has a spherical shape.

* * * * *